United States Patent
Chen

(12) United States Patent (10) Patent No.: US 8,720,014 B2
Chen (45) Date of Patent: May 13, 2014

(54) TRIGGER GRIP

(75) Inventor: Chi-Yuan Chen, Taipei (TW)

(73) Assignees: Yasuharu Nagaki, Osaka (JP); James Ke Liu, Ontario, CA (US)

( * ) Notice: Subject to any disclaimer, the term of this patent is extended or adjusted under 35 U.S.C. 154(b) by 205 days.

(21) Appl. No.: 13/137,897

(22) Filed: Sep. 21, 2011

(65) Prior Publication Data

US 2012/0005864 A1 Jan. 12, 2012

(51) Int. Cl.
*F16G 11/04* (2006.01)

(52) U.S. Cl.
USPC ............... 24/132 WL; 24/132 R; 24/134 N

(58) Field of Classification Search
USPC ........ 24/132 R, 132 WL, 134 N; 182/18, 192
See application file for complete search history.

(56) References Cited

U.S. PATENT DOCUMENTS

| | | | | |
|---|---|---|---|---|
| 1,942,625 A * | 1/1934 | Whalan et al. | ............... | 24/132 R |
| 2,140,837 A * | 12/1938 | Harry | ............... | 24/134 N |
| 2,985,933 A * | 5/1961 | Peterson et al. | ............ | 24/132 R |
| 3,161,432 A * | 12/1964 | O'Leary | ............. | 294/106 |
| 3,599,297 A * | 8/1971 | Sievers | ......... | 24/132 R |
| 3,923,333 A * | 12/1975 | Whaley | .......... | 294/104 |
| 4,541,149 A * | 9/1985 | Jensen | .......... | 24/134 R |
| 4,878,270 A * | 11/1989 | Westerkamp | ............ | 24/132 R |
| 5,038,443 A * | 8/1991 | Verdina et al. | ............. | 24/134 R |
| 5,083,350 A * | 1/1992 | Sandreid | ............ | 24/134 R |
| 5,133,111 A * | 7/1992 | Brown | ........... | 24/134 R |
| 5,265,696 A * | 11/1993 | Casebolt | ............ | 182/8 |
| 5,316,103 A * | 5/1994 | Bell et al. | ............ | 182/18 |
| 5,638,919 A * | 6/1997 | Pejout | .......... | 182/192 |
| 6,899,203 B1 * | 5/2005 | Golden et al. | ............. | 188/65.4 |
| 7,080,716 B2 * | 7/2006 | Cherpitel | ............ | 182/192 |

FOREIGN PATENT DOCUMENTS

TW 529214 4/2003

* cited by examiner

*Primary Examiner* — Robert J Sandy
*Assistant Examiner* — David Upchurch

(57) ABSTRACT

A trigger grip (100) includes a body (10) including an upper jaw (11) extending laterally, a pivot section (12) depending from one end of the upper jaw, and a sleeve section (13) depending from the other end of the upper jaw, the sleeve section including a slot (131) and an extension (132) depending from the slot; a pivotal link (20) pivotably secured to the pivot section (12) and including a jaw member disposed below the upper jaw (11) in an inoperative position; and a lever (30) including a first hole (31) at one end, a second hole (32) at the other end, and a protuberance (33) depending from the other end, the lever (30) being inserted through the slot (131) with its first hole (31) pivotably secured to the pivotal link (20).

13 Claims, 10 Drawing Sheets

TRIGGER GRIP

BACKGROUND OF THE INVENTION

1. Field of the Invention

The invention relates to wire gripping tools and more particularly to a trigger grip.

2. Description of Related Art

Taiwan Utility Model Publication No. 529,214 entitled wire grip discloses a grip for installing wires. The grip comprises a body, a wedge, and a biasing member.

The body has a base, an installation member at one end of the base for installing insulators on a utility pole, and two opposing upper jaws at the other end of the base for covering the top of the wedge. Also, core of a wire may be inserted into either side of the upper jaws.

The wedge is provided on a wedge conductor surface of the body and is adapted to move thereon. Core of a wire may be inserted into a gripping section of the installation member. Next, the wire core is gripped by the gripping section.

The biasing member is a spring member for making the wedge as a spring biased member. The biasing member is secured by a screw driven into either side of the wedge. Thus, elastic force may be transported to the wedge. A projection is provided on an opening of the wedge. The projection may facilitate the wedge to move to the installation member.

However, the prior art wire grip suffers a number of drawbacks. For example, the screw for securing the wedge to the installation member tends to separation after a period time of use. Further, a user has to use both hands to pull the projection to open the jaws prior to wire installation. This is very inconvenient in use. Thus, the need for improvement still exists.

SUMMARY OF THE INVENTION

It is therefore one object of the invention to provide a trigger grip comprising a body comprising an upper jaw extending laterally, a pivot section depending from one end of the upper jaw, and a sleeve section depending from the other end of the upper jaw, the sleeve section including a slot and an extension depending from the slot; a pivotal link pivotably secured to the pivot section and comprising a jaw member disposed below the upper jaw in an inoperative position; and a lever comprising a first hole at one end, a second hole at the other end, and a protuberance depending from the other end, the lever being inserted through the slot with its first hole pivotably secured to the pivotal link.

The above and other objects, features and advantages of the invention will become apparent from the following detailed description taken with the accompanying drawings.

DETAILED DESCRIPTION OF THE INVENTION

Figure 1:
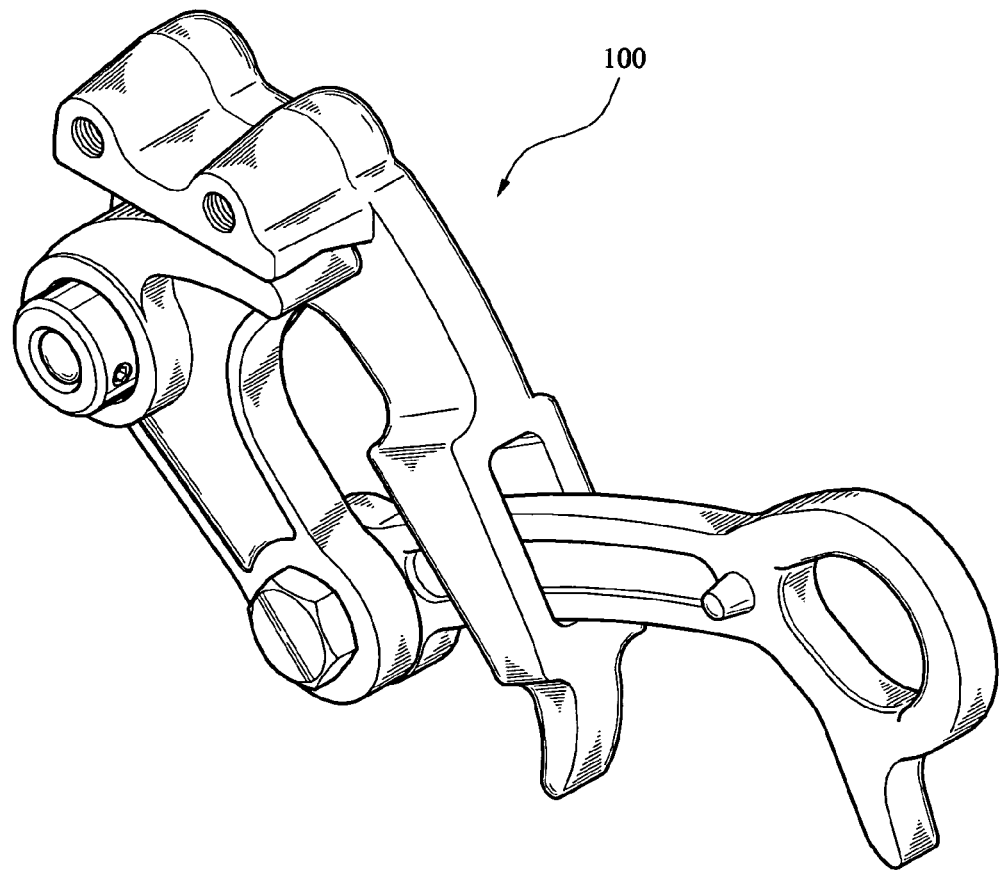
FIG. 1 is a perspective view of a trigger grip according to a first preferred embodiment of the invention, a pivotal plate yet to assemble.
Figure 2:
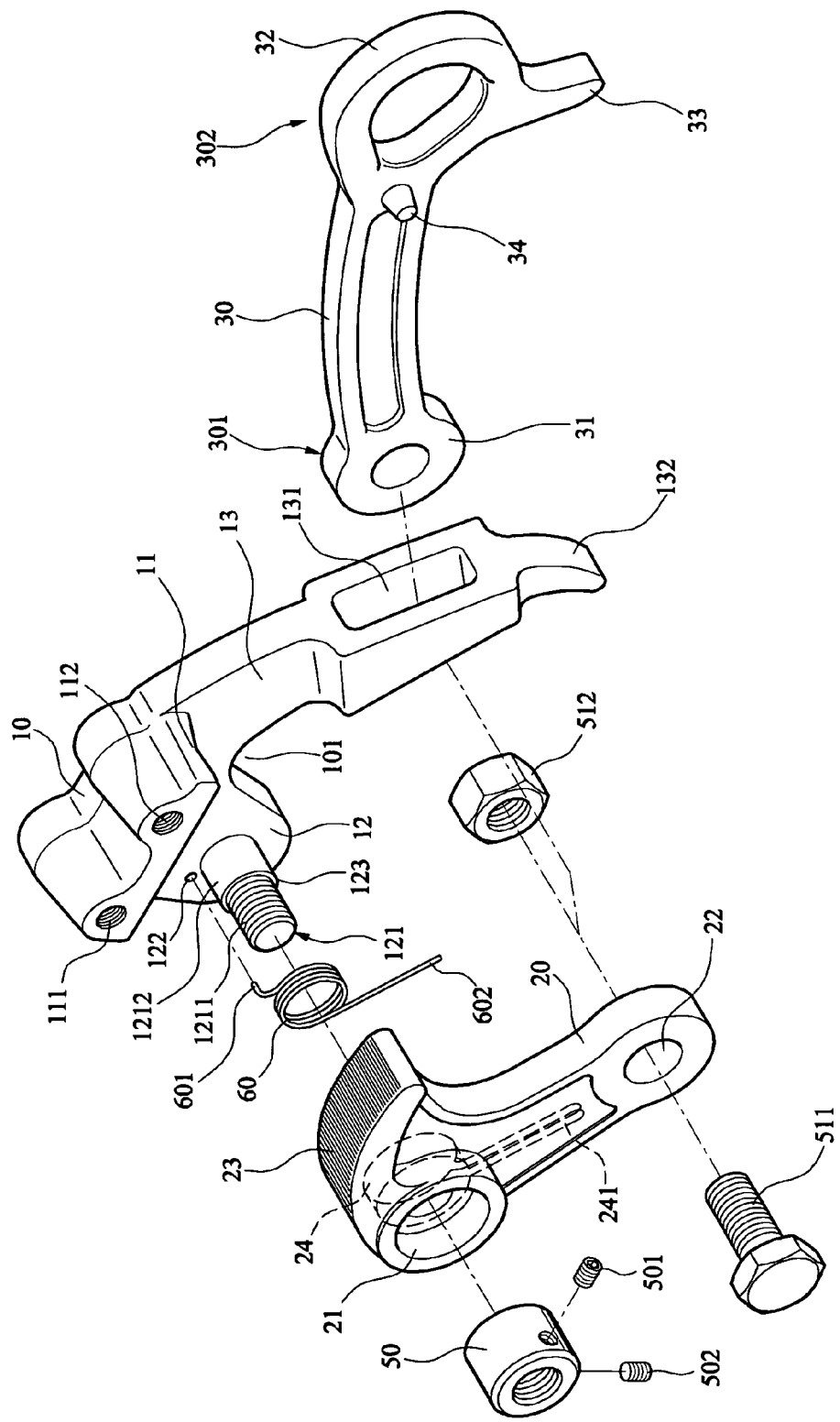
FIG. 2 is perspective exploded view of FIG. 1.
Figure 3:
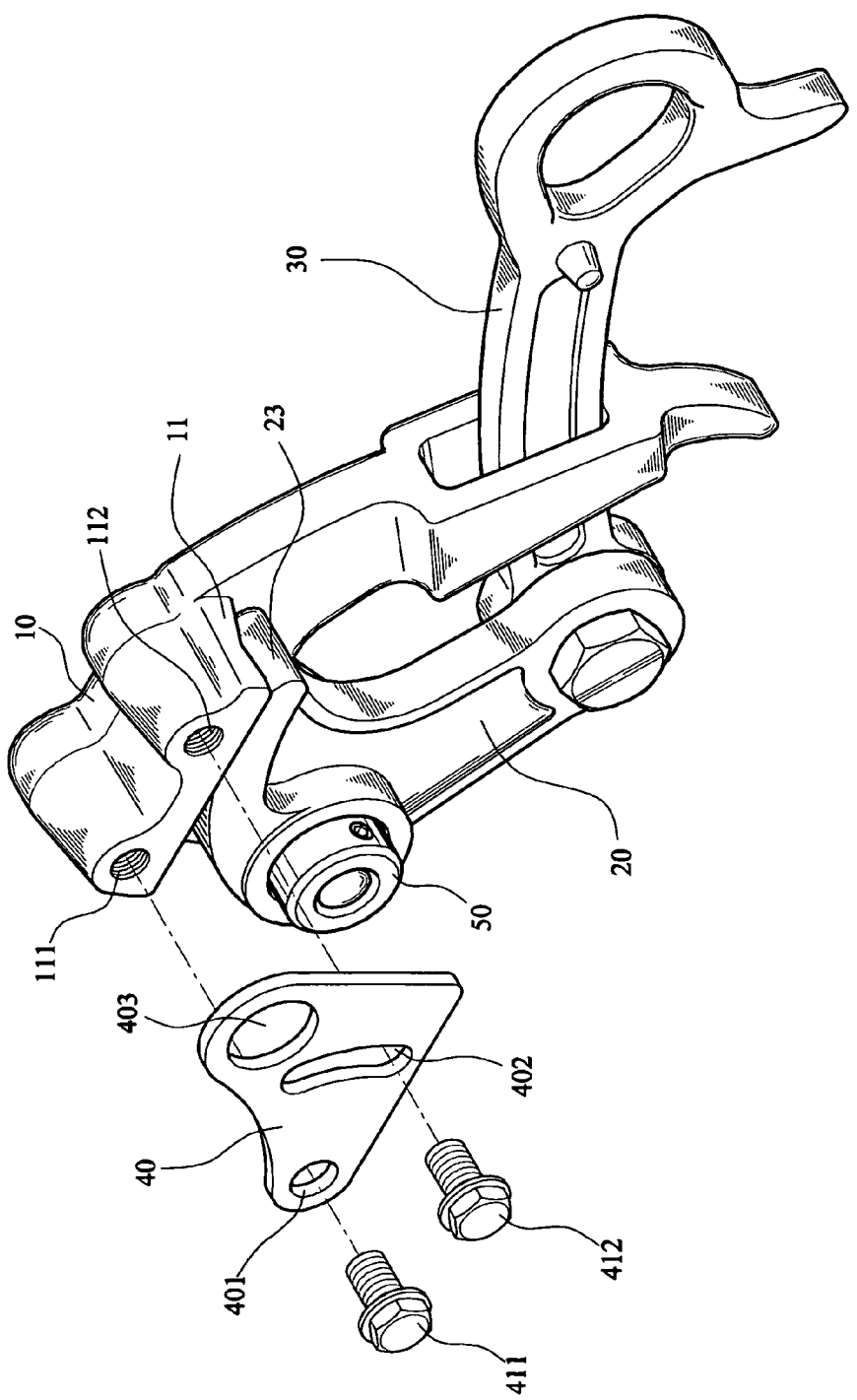
FIG. 3 is a partial perspective exploded view of FIG. 1 showing the pivotal plate to be assembled with the trigger grip.
Figure 4:
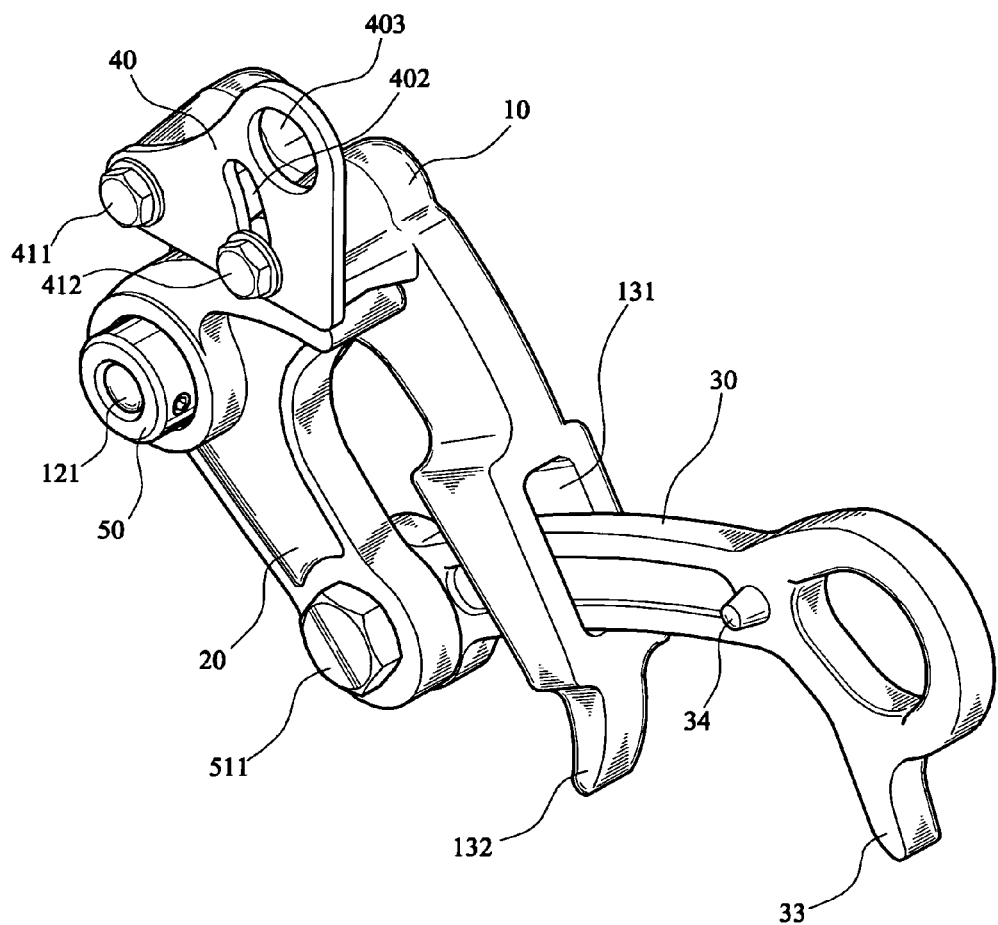
FIG. 4 is a perspective view of the assembled pivotal plate and the trigger grip shown in FIG. 3.
Figure 5:
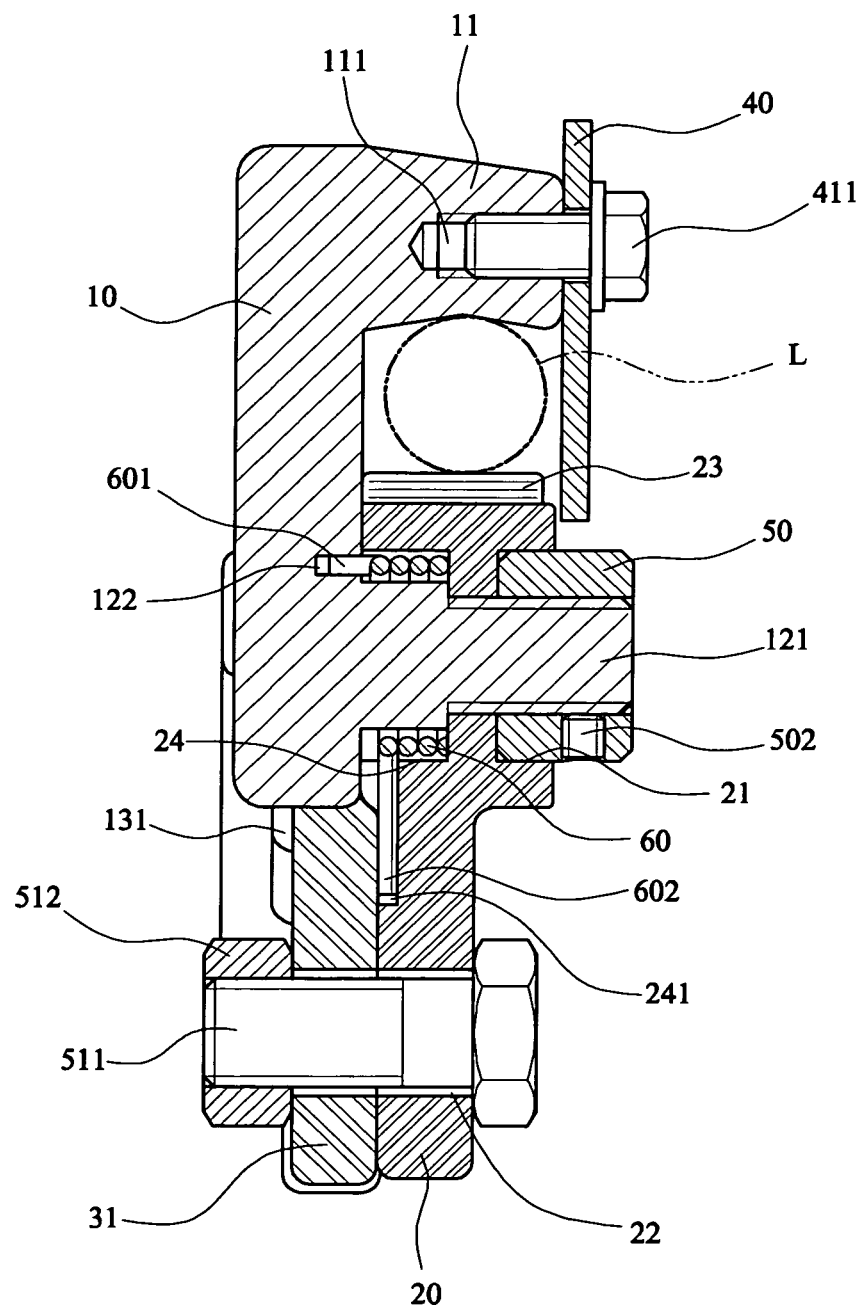
FIG. 5 is a longitudinal sectional view of FIG. 4.
Figure 6:
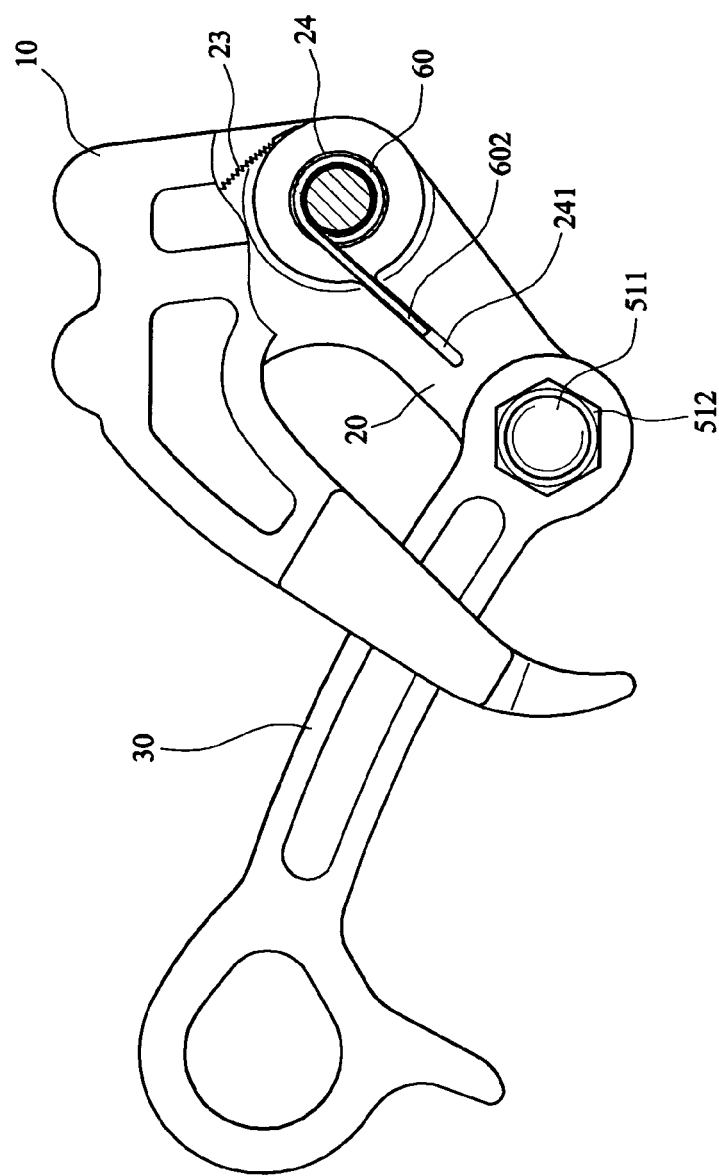
FIG. 6 is a side elevation in part section of FIG. 1.

Referring to FIGS. 1 to 9, a trigger grip 100 in accordance with a first preferred embodiment of the invention comprises a body 10, a pivotal link 20, a lever 30, and a pivotal plate 40 each discussed in detail below.

The body 10 comprises a curved bottom recess 101, an upper jaw 11 extending laterally, two spaced threaded holes 111, 112 on top of the upper jaw 11, a pivot section 12 provided on one side of the recess 101, and a sleeve section 13 provided on the other side of the recess 101.

The pivot section 12 comprises a solid, stepped-diameter, cylindrical projection 121 projecting laterally. A positioning hole 122 is provided on the pivot section 12 proximate an enlarged base 1212 of the projection 121. The projection 121 further comprises external threads 1211 and a shoulder 123 at a joining portion of the threads 1211 and the base 1212. The provision of the projection 121 can prevent the body 10 from being adversely deformed or even breaking.

The sleeve section 13 comprises an intermediate slot 131 of rectangular cross-section, and an extension 132 projecting downward from the slot 131.

The substantially triangular pivotal plate 40 comprises a pivot hole 401 at a first corner, a curved slot 402 distal the hole 401, and a hole member 403 at a second corner proximate the slot 402. Screw 411 is driven through the pivot hole 401 into the threaded hole 111 and screw 412 is driven through the slot 402 into the threaded hole 112 respectively. Thus, the pivotal plate 40 may be pivotably secured to the upper jaw 11. That is, the pivotal plate 40 is capable of pivoting about the screw 411.

The pivotal link 20 comprises a first hole 21 at one side of one end, a second hole 22 at the other end, a curved knurled jaw 23 extending a short distance from one end, and a cylindrical recess 24 at the other side of one end spaced from and aligned with the first hole 21, the recess 24 having an elongated groove 241 extending to a position proximate the second hole 22. The jaw 23 is defined as a lower jaw 23.

The lever 30 comprises one holed end 301, the other holed end (i.e., free end) 302, a first positioning hole 31 at one end, a second positioning hole 32 at the other end, a downward extending protuberance 33 adjacent the second positioning hole 32, and a stop member 34 projecting from one side proximate the second positioning hole 32. The protuberance 33 is curved so that the finger of a user may pull the protuberance 33 in operation.

Further assembly of the invention will be described in detail below.

A torsion spring 60 is put on the projection 121 to be proximate the shoulder 123 with one end 601 inserted into the positioning hole 122 for positioning. The recess 24 is put on the torsion spring 60 with the other end 602 of the torsion spring 60 being rested on the groove 241 and the projection 121 projecting out of the first hole 21 a short distance. A nut 50 is threadedly put on the threads 1211 of the projection 121 to be retained. Finally, two threaded fasteners 501, 502 are driven through the nut 50 to pivotably secure the nut 50 to the projection 121. The pivotal link 20 is thus a spring biased member and is capable of pivoting about the nut 50.

The lever 30 is inserted through the slot 131 until one holed end 31 passes the slot 131. The provision of the stop member 34 can prevent the lever 30 from further inserting through the slot 131. Otherwise, the lever 30 may be disengaged from the sleeve section 13. Next, align the one holed end 31 with the second hole 22. Next, drive a bolt 511 through the second hole 22 and the first positioning hole 31. Next, threadedly put a nut 512 on the bolt 511 to pivotably fasten the lever 30 and the pivotal link 20 together. The pivotal link 20 is thus pivotably interconnected the body 10 and the lever 30.

An operation of the invention will be described in detailed below.

Figure 7:
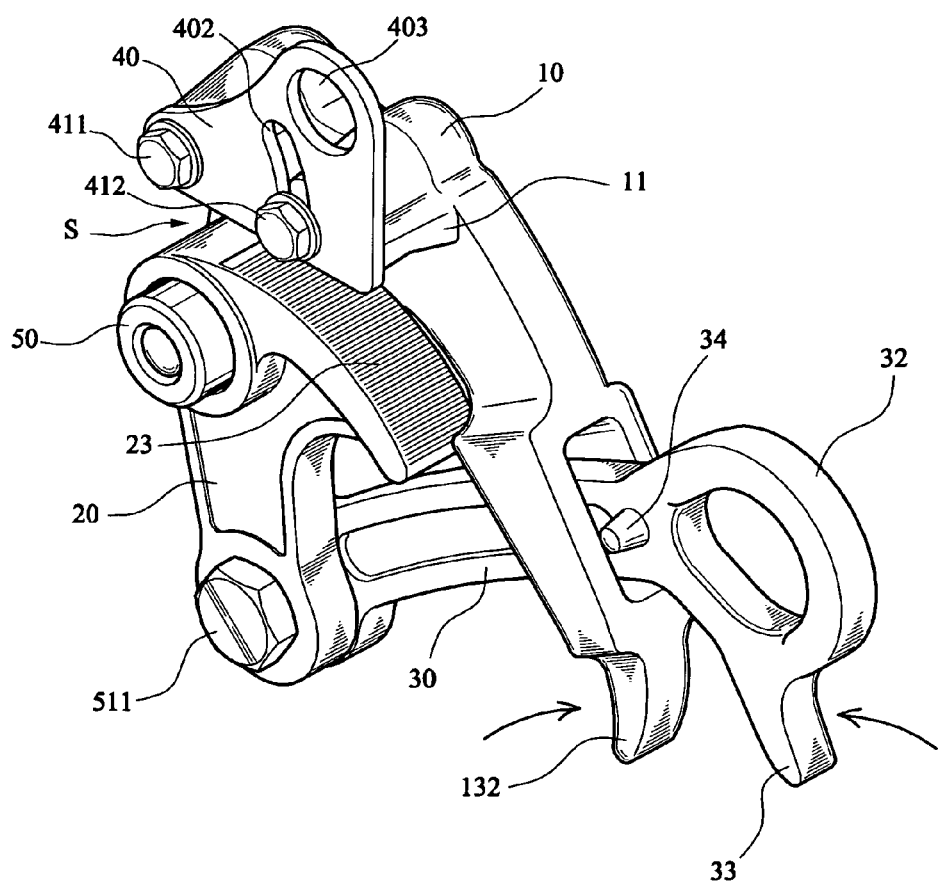
FIG. 7 is a view similar to FIG. 4 showing the trigger grip in use.

As shown in FIG. 7, a user may use one finger to hold the extension 132 (as a trigger) and another finger to hold the protuberance 33 (as a pistol grip) prior to pushing them toward each other as indicated by arrows. A distance between the extension 132 and the protuberance 33 is decreased and the lower jaw 23 moves downward due to the pivotal linking mechanism of the invention. A space S is thus formed between the upper jaw 11 and the lower jaw 23. The downward movement of the lower jaw 23 will be stopped when the sleeve section 13 contacts the stop member 34. Also, the torsion spring 60 is energized.

Figure 8:
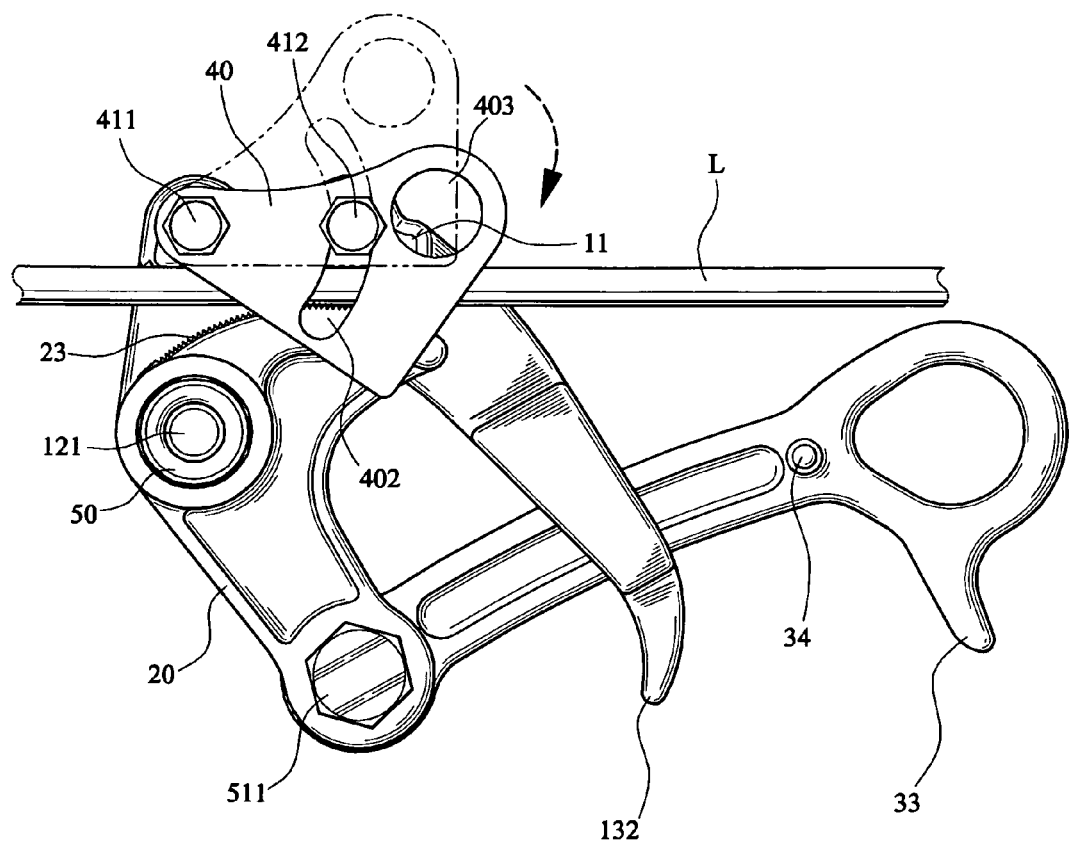
FIG. 8 is a side elevation of FIG. 4 with the wire being gripped when the pivotal plate is in a first configuration.

As shown in FIG. 8, the user may insert a wire L through the space S. Next, the hand of the user may release both the extension 132 and the protuberance 33. The stored elastic energy of the torsion spring 60 is automatically released to return the pivotal link 20 to its inoperative position. And in turn, the lower jaw 23 moves upward until it contacts the wire L. The wire L is thus fastened by both the upper jaw 11 and the lower jaw 23. One finger may insert into the hole member 403 and upward pivot the pivotal plate 40 about the threaded screw 411 with the screw 412 moving along the slot 402 as indicated by arrow. A portion of the pivotal plate 40 is thus disposed besides the wire L for preventing the wire L from lateral dislodgement.

Figure 9:
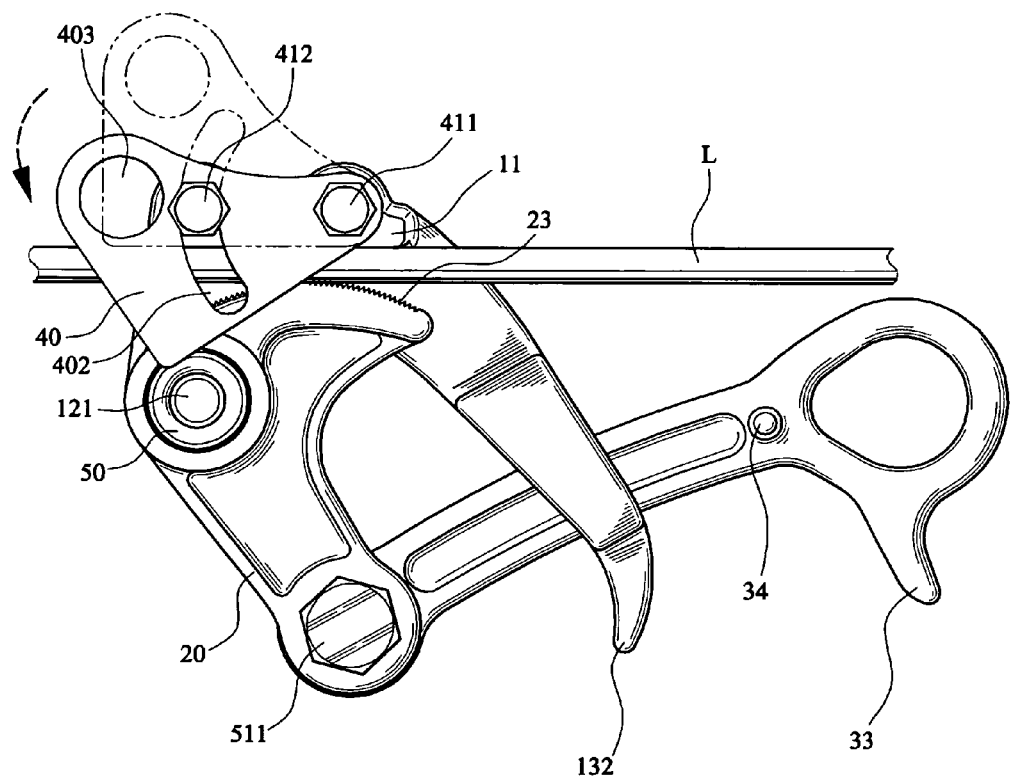
FIG. 9 is a view similar to FIG. 8 with the pivotal plate being in a second configuration.

As shown in FIG. 9, the pivotal plate 40 may be mounted on the body 1 in a second configuration opposite to that shown in FIG. 8. The same effect can be taken in the second configuration.

Figure 10:
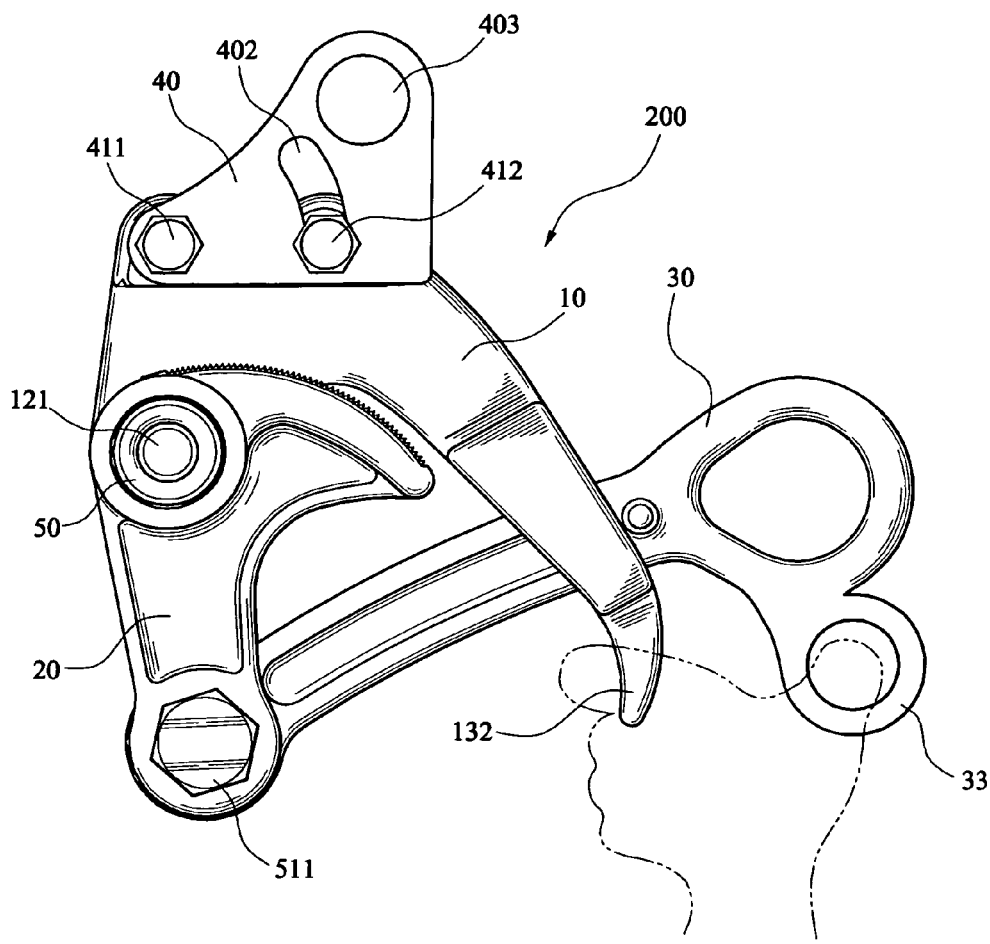
FIG. 10 is a side elevation view of a trigger grip according to a second preferred embodiment of the invention.

Referring to FIG. 10, a trigger grip 200 in accordance with a second preferred embodiment of the invention is shown. The characteristics of the second preferred embodiment are substantially the same as that of the first preferred embodiment except the following:

The protuberance 33 of first preferred embodiment is shaped as a ring 33 which facilitates the gripping operation of the invention.

While the invention has been described in terms of preferred embodiments, those skilled in the art will recognize that the invention can be practiced with modifications within the spirit and scope of the appended claims.

What is claimed is:

1. A trigger grip comprising:
a body (10) comprising an upper jaw (11) extending laterally, a pivot section (12) depending from one end of the upper jaw (11), and a sleeve section (13) depending from an other end of the upper jaw (11), the sleeve section (13) including a slot (131) and an extension (132) depending from the slot (131);
a pivotal link (20) pivotably secured to the pivot section (12) and comprising a jaw member (23) disposed below the upper jaw (11) in an inoperative position; and
a lever (30) comprising a first hole (31) at one end, a second hole (32) at an other end, and a protuberance (33) depending from the other end, the lever (30) being inserted through the slot (131) with its first hole (31) pivotably secured to the pivotal link (20),
wherein the pivot section (12) comprises a stepped-diameter, cylindrical projection (121) extending laterally, the projection (121) including a base (1212) with the pivotal link (20) engaged therewith, an externally threaded member (1211) having a diameter smaller than that of the base (1212), and a shoulder (123) at a joining portion of the externally threaded member (1211) and the base (1212), and
wherein the body (10) further comprises a positioning hole (122) proximate the base (1212) of the pivot section (12), wherein the pivotal link (20) further comprises a first hole (21) at one side of one end, and a cylindrical recess (24) at the other side of one end spaced from and aligned with the first hole (31), the recess (24) having an elongated groove (241), the trigger grip further comprising a torsion spring (60) put on the projection (121) with one end inserted into the positioning hole (122) for positioning, the torsion spring (60) being further received in the recess (24) with the other end thereof rested on the groove (241).

2. The trigger grip of claim 1, wherein the jaw member (23) is curve and knurled.

3. The trigger grip of claim 1, wherein the lever (30) further comprises a stop member (34) projecting from one side proximate the second hole (32) for preventing the lever (30) from disengaging from the slot (131).

4. The trigger grip of claim 1, wherein the extension (132) is served as a trigger, and the protuberance (33) is served as a trigger grip, the trigger and the trigger grip being in cooperation each other.

5. The trigger grip of claim 1, wherein the extension (132) is served as a trigger, and the protuberance (33) is shaped as a ring to serve as a trigger grip, the trigger and the trigger grip being in cooperation each other.

6. The trigger grip of claim 1, further comprising a pivotal plate (40) pivotably secured to one side of the body (10), the pivotal plate (40) being capable of pivoting to partially cover both the upper jaw (11) and the jaw member (23).

7. A trigger grip comprising:
a body (10) comprising an upper jaw (11) extending laterally, a pivot section (12) depending from one end of the upper jaw (11), the pivot section (12) including a stepped-diameter, cylindrical projection (121) extending laterally, and a sleeve section (13) depending from an other end of the upper jaw (11), the sleeve section (13) including a slot (131);
a pivotal link (20) pivotably secured to the projection (121) and comprising a jaw member (23) disposed below the upper jaw (11) in an inoperative position; and
a lever (30) comprising a first hole (31) at one end and a second hole (32) at an other end, the lever (30) being inserted through the slot (131) with its first hole (31) pivotably secured to the pivotal link (20),
wherein the projection (121) comprises a base (1212) with the pivotal link (20) engaged therewith, an externally threaded member (1211) having a diameter smaller than that of the base (1212), and a shoulder (123) at a joining portion of the externally threaded member (1211) and the base (1212); and
wherein the body (10) further comprises a positioning hole (122) proximate the base (1212) of the pivot section (12), wherein the pivotal link (20) further comprises a first hole (21) at one side of one end, and a cylindrical recess (24) at the other side of one end spaced from and aligned with the first hole (31), the recess (24) having an elongated groove (241), the trigger grip further comprising a torsion spring (60) put on the projection (121) with one end inserted into the positioning hole (122) for positioning, the torsion spring (60) being further received in the recess (24) with the other end thereof rested on the groove (241).

8. The trigger grip of claim 7, wherein the jaw member (23) is curve and knurled.

9. The trigger grip of claim 7, wherein the lever (30) further comprises a stop member (34) projecting from one side proximate the second hole (32) for preventing the lever (30) from disengaging from the slot (131).

10. The trigger grip of claim 7, wherein the sleeve section (13) further comprises an extension (132) depending from the slot (131), and wherein the lever (30) further comprises a protuberance (33) depending from the other end.

11. The trigger grip of claim 10, wherein the extension (132) is served as a trigger, and the protuberance (33) is served as a trigger grip, the trigger and the trigger grip being in cooperation each other.

12. The trigger grip of claim 10, wherein the extension (132) is served as a trigger, and the protuberance (33) is shaped as a ring to serve as a trigger grip, the trigger and the trigger grip being in cooperation each other.

13. The trigger grip of claim 7, further comprising a pivotal plate (40) pivotably secured to one side of the body (10), the pivotal plate (40) being capable of pivoting to partially cover both the upper jaw (11) and the jaw member (23).

* * * * *